(12) United States Patent
Schaeffer et al.

(10) Patent No.: US 9,037,326 B2
(45) Date of Patent: May 19, 2015

(54) METHOD FOR DISCONNECTING AN ELECTRICAL MACHINE ON A RUNNING GEAR OF A VEHICLE, IN PARTICULAR A HYBRID MOTOR VEHICLE

(75) Inventors: Eric Schaeffer, Paris (FR); Florian Galinaud, Paris (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 80 days.

(21) Appl. No.: 13/515,872

(22) PCT Filed: Jul. 12, 2010

(86) PCT No.: PCT/FR2010/052628
§ 371 (c)(1),
(2), (4) Date: Jun. 14, 2012

(87) PCT Pub. No.: WO2011/080439
PCT Pub. Date: Jul. 7, 2011

(65) Prior Publication Data
US 2012/0253577 A1    Oct. 4, 2012

(30) Foreign Application Priority Data
Dec. 17, 2009    (FR) ...................................... 09 59135

(51) Int. Cl.
*B60L 9/00*    (2006.01)
*B60L 11/00*    (2006.01)
(Continued)

(52) U.S. Cl.
CPC .............. *B60L 11/14* (2013.01); *Y10T 477/325* (2015.01); *B60K 6/48* (2013.01); *B60K 6/52* (2013.01);
(Continued)

(58) Field of Classification Search
CPC ..... B60W 10/11; B60W 10/08; B60W 20/10; B60W 2300/36; B60W 10/18; B60W 20/20; A61B 2017/00398; A61B 19/448; A61B 17/068; B60K 6/547; B60K 6/40; B60K 6/52; B60K 6/46; B60K 28/12; Y02T 10/6286; Y02T 10/48; Y02T 10/84; Y02T 10/70
USPC ........... 701/22, 102, 112, 58, 67, 124, 60, 61, 701/64, 51, 1, 84; 180/65.225, 65.165, 248, 180/165, 414, 404, 214, 245; 903/902, 930, 903/946
See application file for complete search history.

(56) References Cited

U.S. PATENT DOCUMENTS 4,694,943 A * 9/1987 Petrak .............................. 192/35
5,022,503 A * 6/1991 Wakabayashi .................... 477/8
(Continued)

FOREIGN PATENT DOCUMENTS

EP    1393952    3/2004
EP    1393959    3/2004
(Continued)

OTHER PUBLICATIONS

International Search Report for PCT application PCT/FR2010/052628 mailed Apr. 4, 2011.

*Primary Examiner* — Calvin Cheung
*Assistant Examiner* — Luis A Martinez Borrero
(74) *Attorney, Agent, or Firm* — Polster, Lieder, Woodruff & Lucchesi, L.C.

(57) ABSTRACT

A method for disconnecting an electrical machine connected with the wheels of a vehicle's drive axle by means of a dog clutch having intermeshing couplers includes, upon receipt of a command to disengage, two successively activated steps. In the first step, a torque equal to a calibrated threshold of a target torque (d) is applied to the electrical machine so to effect a zero torque between the couplers. During this step, a dog clutch actuator is deactivated so to allow the dog clutch to disengage from the electrical machine as quickly as possible. Next, a torque having a value determined according to a slope whose value ranges from the calibrated threshold of the target torque (d) to zero is applied to the electrical machine.

9 Claims, 2 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60L 11/14* (2006.01)
  *B60K 6/48* (2007.10)
  *B60K 6/52* (2007.10)
  *B60L 11/12* (2006.01)
  *F16D 48/06* (2006.01)
  *B60W 20/00* (2006.01)

(52) U.S. Cl.
  CPC ............ B60L 11/123 (2013.01); *B60W 20/00* (2013.01); F16D 48/06 (2013.01); *F16D 2500/10425* (2013.01); *F16D 2500/10462* (2013.01); *F16D 2500/3026* (2013.01); *F16D 2500/50615* (2013.01); *F16D 2500/7046* (2013.01); *Y02T 10/6217* (2013.01); *Y02T 10/6221* (2013.01); *Y02T 10/6265* (2013.01); *Y02T 10/7077* (2013.01); *Y02T 10/7258* (2013.01)

(56) References Cited

U.S. PATENT DOCUMENTS

| | | | |
|---|---|---|---|
| 5,799,749 A * | 9/1998 | Yamamoto et al. | 180/247 |
| 5,904,068 A * | 5/1999 | Genise | 74/335 |
| 6,082,514 A * | 7/2000 | Averill | 192/69.42 |
| 6,319,168 B1 * | 11/2001 | Morris et al. | 477/5 |
| 2005/0040002 A1* | 2/2005 | Teraoka | 192/53.34 |
| 2006/0151220 A1* | 7/2006 | Taniguchi et al. | 180/65.5 |
| 2008/0076616 A1* | 3/2008 | Kidokoro et al. | 475/5 |
| 2008/0167782 A1* | 7/2008 | Belmont et al. | 701/53 |
| 2008/0230295 A1* | 9/2008 | Grogg | 180/248 |
| 2008/0300744 A1* | 12/2008 | Katsuta et al. | 701/22 |
| 2010/0062891 A1* | 3/2010 | Ekonen et al. | 475/223 |
| 2010/0078238 A1* | 4/2010 | Oba et al. | 180/65.225 |
| 2010/0147610 A1* | 6/2010 | Katsuta et al. | 180/65.265 |
| 2010/0227734 A1* | 9/2010 | Wallner et al. | 477/5 |
| 2010/0228412 A1* | 9/2010 | Sah | 701/22 |
| 2010/0274427 A1* | 10/2010 | Ebuchi et al. | 701/22 |
| 2010/0279816 A1* | 11/2010 | Soliman | 477/3 |
| 2011/0040432 A1* | 2/2011 | Kaltenbach et al. | 701/22 |
| 2011/0137505 A1* | 6/2011 | Stervik et al. | 701/22 |
| 2011/0288703 A1* | 11/2011 | Falkenstein et al. | 701/22 |
| 2011/0319213 A1* | 12/2011 | Ekonen et al. | 475/86 |
| 2011/0320084 A1* | 12/2011 | Muta et al. | 701/22 |
| 2012/0072065 A1* | 3/2012 | Minamikawa et al. | 701/22 |

FOREIGN PATENT DOCUMENTS

| | | |
|---|---|---|
| FR | 2809352 | 11/2001 |
| FR | 2929574 | 10/2009 |
| JP | 11-243608 | 9/1999 |

\* cited by examiner

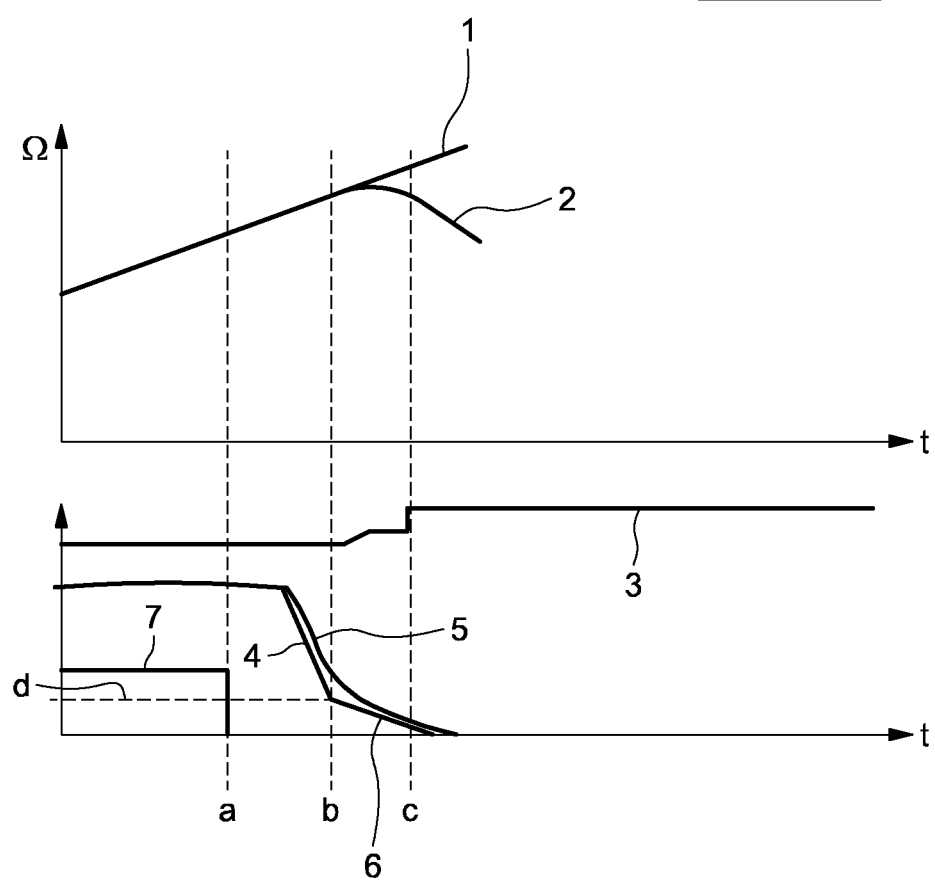

METHOD FOR DISCONNECTING AN ELECTRICAL MACHINE ON A RUNNING GEAR OF A VEHICLE, IN PARTICULAR A HYBRID MOTOR VEHICLE

CROSS-REFERENCE TO RELATED APPLICATIONS

This application is the US National stage, under 35 U.S.C. §371, of International App. No. PCT/FR2010/052628 which was filed on Dec. 7, 2010 and claims priority to French Application No. 0959135 which was filed on Dec. 17, 2009.

BACKGROUND OF THE INVENTION

The invention relates to a method and system for disconnecting an electrical machine from the drive axle of a vehicle such as a hybrid automotive vehicle while the vehicle is running. The method and system are particularly suited for a hybrid vehicle having a combustion engine in such manner as to make the electrical machine contribute to the traction of the vehicle.

Publication FR2723553, for instance, discloses an automotive vehicle having a selective command system for separate or simultaneous actuation of electrical and thermal power trains.

U.S. Pat. No. 5,403,244 discloses an electrical power train of a vehicle with direct transmission coupling and using a synchronization means based on friction plates similar to couplings with clutch plates. Clutch type couplings generate energy losses.

To increase efficiency, the known state of the technology is oriented toward dog type clutch couplings. In this regard, publication FR20905438 describes a control method employing two dog clutch couplers in which a force exerted on one of the dog clutch couplers, to bring it closer to the other dog clutch coupler, is modulated as a function of different approach phases.

The actual running of a vehicle makes it difficult to rapidly disengage a dog clutch without a shock occurring. This is so in all circumstances; i.e., regardless of whether the vehicle is running at a constant speed, or is accelerating or decelerating.

BRIEF SUMMARY

One goal of the present invention is to provide for simplified disengagement of the clutch without the use of a transmission clutch and without requiring modulation of a force in translation; in particular, when the vehicle is running.

To achieve this goal, the invention provides a method for disconnecting an electrical machine which is connected with the wheels of the vehicle's drive axle by means of a dog clutch. The method is advantageous in that it comprises two successively activated steps starting with a command to disengage:

in a first controlled step of the connected electrical machine, a torque equal to a calibrated threshold of a target torque (d) is applied to the electrical machine, this being done in order to effect a zero torque between the dog clutch couplers; and in a second controlled step of the connected electrical machine, a torque having a value determined according to a slope whose value ranges from the calibrated threshold of the target torque to zero, is applied to the electrical machine.

In particular, in the first controlled step, a dog clutch actuator is deactivated in order to allow the dog clutch to disengage from the electrical machine to which it is connected as quickly as possible.

More particularly, in the second controlled step, the actuator is commanded to separate the segments comprising the dog clutch.

Advantageously, the calibrated threshold of the target torque is adaptable within certain parameters.

The invention has also as an object a system for coupling an electrical machine with the wheels of a drive axle of a vehicle when the vehicle is running. The system comprises:

an upstream dog clutch coupler which rotates together with the electrical machine;

a downstream dog clutch coupler which rotates together with the wheels of the vehicle, and an actuator arranged for bringing the two dog clutch couplers closer together in translation along a common axis of rotation; and an electronic device arranged for receiving a disengagement request, and for controlling the torque of the electrical machine by applying to it a torque equal to a calibrated target torque threshold. This results in a zero torque first being effected between the dog clutch couplers, and then a torque being applied in accordance with a slope having a value starting at the calibrated target torque threshold and ending with a zero value.

In particular, the coupling system comprises a dog clutch actuator for separating the dog clutch couplers.

Advantageously, the calibrated target torque threshold is adaptable in accordance with certain parameters.

The invention has also as an object an automotive vehicle incorporating a system according to the invention.

BRIEF DESCRIPTION OF THE DRAWINGS

The invention will be better understood, and other goals, characteristics, details and advantages of the invention will become clear during the following explanatory description of a particular implementation mode, actually a preferred mode of the invention, provided as a non-limiting illustrating example, with reference to the attached schematic drawings, in which:

FIG. 3 is a timing chart for explaining the steps of the coupling method according to the invention.

With reference to FIG. 1, a hybrid type vehicle 10 comprises a power train group (GMP) 11 arranged for driving two front wheels 14 of vehicle 10, and a power train group 12 arranged for driving two rear wheels 44 mounted on the rear axle of vehicle 10. The power train group 11 comprises, in known manner, a combustion engine (situated here strictly for illustrative purposes) in the front of the vehicle. The power train group 12 comprises an electrical machine 42 connected to wheels 44 by a coupling mechanism 43.

FIG. 2 shows in more detail the power train group 12 of FIG. 1. To simplify the Fig. and make it easier to understand, the axis of the electrical machine 42 and the axis of wheels 44 are schematically projected on the same axis 46, above which are represented, in simplified form, parts of the electrical machine 42, coupling mechanisms 43 and the two wheels 44.

Figure 1:
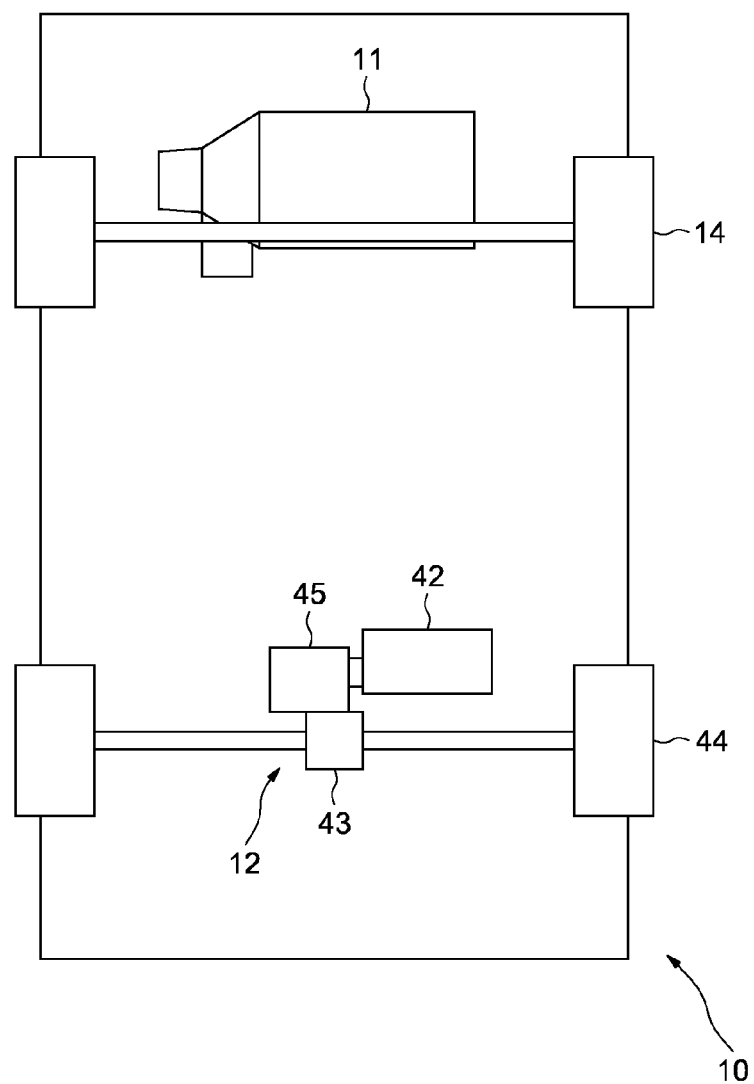
FIG. 1 is a schematic view of a hybrid automotive vehicle comprising a coupling system according to the invention.

In the coupling mechanism 43, a dog clutch system comprises an upstream dog clutch coupler 51 and a downstream dog clutch coupler 52. The upstream dog clutch coupler 51 rotates together with a gear box 45 which is connected to the output shaft of the electrical machine 42. The downstream dog clutch coupler 52 rotates together with wheels 44 via a differential mechanism which balances, in known manner, the torque between the wheels 44 of the rear axle; in particular, when the wheels spin at different speeds as, for instance, in a turn.

Dog clutch coupler 51 rotates around axis 46 at a rotational speed which is proportional or equal to the rotational speed of the electrical machine 42, and transmits a torque proportional to the torque generated by the electrical machine 42, this preserving the power supplied by the electrical machine 42 with an efficiency factor which takes into account various transmission losses between the electrical machine 42 and the dog clutch coupler 51. The transmission losses in the electrical machine 42, and between the electrical machine 42 and the dog clutch coupler 51, represent a drag torque of the part upstream of dog clutch coupler 51.

Figure 2:
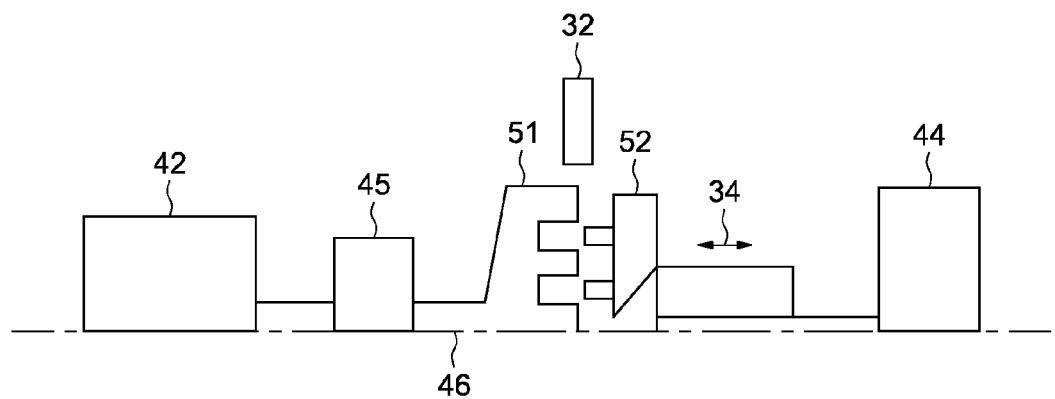
FIG. 2 is a schematic view of the coupling system according to the invention.

Dog clutch coupler 52 rotates around axis 46 at a rotational speed which is a function of the speed of wheels 44. A torque applied on dog clutch coupler 52 is transmitted to wheels 44. When the dog clutch coupler 52 is disengaged from dog clutch coupler 51, as shown in FIG. 2, the wheels 44 can turn, or not turn, independently of the rotational speed of the electrical machine 42.

The coupling mechanism 43 comprises an actuator 34 arranged for displacing dog clutch coupler 52 in translation along the axis 46. The opposite faces of dog clutch couplers 51 and 52 are provided with teeth and cavities. The teeth of one dog clutch coupler are dimensioned so that they fit in the cavities of the other dog clutch coupler. In this way, when the teeth of dog clutch coupler 52 are facing the cavities of dog clutch coupler 51, as shown in FIG. 2, actuator 34 can engage dog clutch coupler 52 with dog clutch coupler 51 so that dog clutch couplers 51 and 52 are rotating together around axis 46. An on-or-off position sensor 32 is mounted in the coupling mechanism 43 to detect the fully engaged position of dog clutch coupler 52 in dog clutch coupler 51.

When the electrical machine is connected through the coupling mechanism, dog clutch couplers 51 and 52 rotate together. The teeth of dog clutch coupler 52 fit within openings formed in dog clutch coupler 51. When the electrical machine operates as a motor, it applies a torque to the wheels 44 and the sides of the opening in dog clutch coupler 51. The normal line of this force is in the direction of rotation, and a pressure force is exerted against the sides of the opposing teeth of dog clutch coupler 52. This generates frictional forces according to Coulomb's law of friction. Similarly, when the electrical machine 42 is operating as a generator, it receives a torque from the wheels 44, and the sides of the openings in dog clutch coupler 51. The normal line of this force is now oriented in the opposite direction of rotation, and the components are subjected to pressure forces exercised by the opposite faces of the teeth of dog clutch coupler 52; again generating friction forces according to Coulomb's law of friction. The friction forces, which increase with increasing torque, counteract actuator 34 in the translational displacement of the dog clutch coupler 52, along axis 46, in the direction of disengagement.

A solution consisting in dimensioning a favorable form of the dog clutch couplers, in order to facilitate disengagement in the presence of a torque, poses a problem of orientation because of the two possible opposite directions of torque application; this depending on whether the electrical machine is operating as a motor or as a generator. Over-dimensioning of actuator 34, in order to overcome the friction forces in translation, has the disadvantage of producing premature wear of the dog teeth. A specific surface treatment of the dog teeth to overcome wear has the disadvantage of significantly increasing fabrication cost. As dog clutch coupler 52 is disengaged from dog clutch coupler 51, the contact surface between the teeth decreases so that the pressure forces resulting from the torque have a tendency of increasing until they produce a rotational slip of dog clutch coupler 51 against dog clutch coupler 52 at the moment that the dog clutch coupler 52 separates from dog clutch coupler 51. The stresses thus generated on the teeth constitute another source of wear, and even of fractures. The few phenomena, among others, which are mentioned here, illustrate the difficulty of rapidly disengaging, without shock, the dog clutch couplers when the vehicle is being driven and the driver commands a decoupling of the electrical machine of the vehicle. The mechanical architecture of the vehicle's rear axle system does not include a clutch or a synchronizer. The only movement of the system is the translation of one of the dog clutch couplers 51, 52 as effected or actuated by actuator 34.

To remedy this problem, the rear wheel drive axle group includes an electronic device which controls, as we will now explain, in precise manner, the torque of the electrical machine 42. This is done in combination with sequential control of dog clutch actuator 34 in order to achieve rapid decoupling without the previously noted shock. The electronic device is connected to actuator 34 and sensor 32 in the coupling mechanism 43. The electronic device is also connected to the electrical machine 42 by a current regulated electrical generator. The electrical generator is for instance supplied in known manner starting from a battery (not shown). Alternately, the electronic device comprises electronic circuits for digital or analog processing and arranged and/or programmed to execute the process steps which will be explained now with reference to FIG. 3.

To explain the process steps, FIG. 3 shows the status of the different signals as a function of time.

Specifically, curve 7 represents the coupling command signal for a vehicle speed greater than or equal to 5 km/h. Up to time a when a decoupling request is received, the process is in the initial stage in which the dog clutch couplers 51 and 52 are engaged with each other so that the electrical machine 42 is connected to wheels 44. The command signal is represented by a high value on curve 7 which switches, at time a, to a low value. It will be understood that the high and low values are here pure conventions and that the initial stage can also be represented by a low value of the signal followed, beyond time a, by a high value.

Line d represents a calibrated torque level or threshold co above which decoupling is possible. Advantageously, the value of torque co is adaptable with parameters so that it can be calibrated at a value which cancels the torque at the level of the dog clutch couplers. Typically, the torque with value co is the torque which compensates for the drag of the gear box and the torque control uncertainty of the electrical machine.

Curve 1 represents the speed of the wheels 44 at dog clutch coupler 52. In the initial step preceding time a, since the vehicle is driving, an increase of curve 1 denotes, for instance, vehicle acceleration. The goal of the method is to permit declutching no matter what the speed variations of the vehicle throughout the declutching process.

Curve 2 represents the speed of the electrical machine 42 at dog clutch coupler 51, taking into account the gear ratio of gear box 45. In the initial step preceding time a, the electrical machine 42 which is connected to the wheels, runs at the same speed as the wheels. Also during this initial period before time a, the electrical machine is controlled in a speed or torque servo mode.

Speed mode servo control of the electrical machine 42 consists in regulating the speed of the rotor of the electrical machine. In known manner, speed mode servo control of the electrical machine comprises, in general, a first step of speed regulation. This involves generating a current command for operating the electrical machine in such manner as to eliminate the gap in speed between the commanded rotor speed and the resulting measured rotor speed. The current command generated by the first step is applied as an input of a second step in which the current command is subjected to a limitation of the current absorption and supply capacity, respectively, of the electrical machine and the source of electrical energy, such as a battery or a set of high value capacitors. The second step effects current regulation of the electrical machine by generating a voltage command applied to the electrical machine in order to reduce the gap between the current command received from the first step and the resulting measured current in the electrical machine. The electrical voltage signal applied to the electrical machine directly controls an electronic power bridge which modulates the electrical voltage drawn from the source of electrical energy. The current passing through the electrical machine then generates a torque which, in known manner, is proportional to the electrical current at a constant excitation. The resulting torque generated in this way imposes on the electrical machine a rotational speed equal to that commanded, as long as the current does not reach the limit of current absorption and current supply capacity. In the motor and generator modes of operation, the current is respectively positive and negative.

Torque mode servo control of the electrical machine 42 consists in regulating a torque supplied by the rotor of the electrical machine. In known manner, the torque servo mode of the electrical machine also comprises, in general, the first step of speed regulation. This involves generating a current command supplied to the electrical machine in order to reduce the gap in speed between a commanded rotor speed and the resulting measured rotor speed. However, here, the speed command is for a slightly higher speed in the machine's motor mode of operation; or, a respectively slightly lower speed in the machine's generator mode of operation, than the expected value of the measured speed, in order not to close the gap in speed as long as the effectively measured speed is equal to the expected measurement value. The current command generated by the first step is applied as input of a second step in which the current command is now subject to a current limit which corresponds with a specified torque. As previously, the second step performs a current regulation of the electrical machine by generating a voltage command to be applied to the electrical machine in order to close the gap between the current command received from the first step which, at this time, reaches the limit corresponding to the specified torque and the resulting measured current. Again, as previously, the electrical voltage signal applied to the electrical machine directly controls an electronic power bridge which modulates the electrical voltage drawn from the source of electrical energy. The torque then generated by the current passing through the electrical machine is equal to the specified torque. The slightly over-speed or under-speed command, in the case of, respectively, a positive or negative torque command, allows for driving the current to the limit corresponding to the specified torque. In this way, if the electrical machine is accidentally put in a mechanical freewheeling mode, its rotational speed will remain close to the expected speed measurement without falling outside a tolerance range for over-speed or under-speed. This is because reaching one or the other has the effect of closing the speed gap and consequently of naturally saturating the current regulation loop.

Curve 3 represents a signal generated by the position sensor 32. As previously mentioned, in the initial step which precedes time a, the coupling mechanism 43 is engaged, indicated here by a low value of the signal of curve 3.

Curve 4 represents a torque value signal on the electrical machine 42 which, during the initial step of the method, is the value required by the operating speed of the vehicle. For instance, in the case of an acceleration of the vehicle illustrated in FIG. 3, the torque value on the electrical machine 42 is positive.

Curve 5 represents the effectively generated torque by the electrical machine which can differ from that commanded; for instance, as a function of the response time constant of the control loop of the electrical machine, or other factors.

At the time that the decoupling request is received, the method enters a control step during which the electronic device verifies whether the coupling mechanism 43 is engaged or disengaged. In other words, the electronic device verifies if the position sensor 32 indicates an engaged or disengaged position of dog clutch couplers 51 and 52. If, after verification of the coupling mechanism, the coupling mechanism is engaged, the method includes driving the torque value to the value co as indicated by curve 4. As indicated above, the value of torque co is the value which compensates for the drag losses upstream of dog clutch coupler 51, so that the torque at the dog clutch is almost zero at time b.

As long as the dog clutch couplers are engaged, the speed of the electrical machine, as indicated by curve 2, follows the speed of the wheels, as indicated by curve 1.

As soon as the calibrated target torque threshold d is reached at time b, the electronic control device of the electrical machine generates a command which follows a slope in which the starting point is equal to the calibrated threshold value of the target torque d and the end point a value of zero. As shown on curve 3, in this second torque control step of the electrical machine the dog clutch coupler 52 begins to separate from dog clutch coupler 51, initially in a progressive manner, and then definitively at time c. After disengagement of dog clutch coupler 52 from dog clutch coupler 51, the torque generated by the electrical machine is no longer sufficient to drive it, and its rotational speed decreases as shown on FIG. 2, essentially driven by its own inertia.

At time c, the position sensor 32 sends the information back "dog clutch disengaged". The curves 4, 5 and 6 of FIG. 3 correspond to a motor torque of the electrical machine 42, typically in case of an acceleration of the vehicle. It is understood that the positive torque when the electrical machine in operating in a motor mode is replaced by a negative torque when the machine is operating in a generator mode; for instance, in the case of a deceleration. The curves are then symmetric relative to the time axis. The slopes are inversed so that the slope ends in both cases with zero value at time c.

In economic terms, the exploitation of the torque control possibilities of the electrical machine at any operating speed, associated with a simplified actuator, and controlled in simple manner in on-or-off mode, allows for a significant reduction of the cost relative to more complex systems.

Although the invention is described in connection with a specific implementation mode, it is evident that the invention is not limited to it, and that numerous variants and modifications are possible without exceeding its scope or intent. Specifically, the electrical power train group can be mounted both in the front and in the rear of the vehicle, on a drive axle which is identical or different from the drive axle on which the thermal power train is mounted. Although not shown on FIG. 2, a gear box can also be placed between the upstream dog clutch coupler and the wheels. The displacement of the downstream dog clutch coupler can be replaced by the displacement of the upstream dog clutch coupler.

The invention claimed is:

1. A method of disconnecting an electrical machine coupled with wheels of a drive axle of a vehicle with dog clutch couplers, the drive axle being without a transmission clutch, comprising the steps of:
applying a desired first torque to the electrical machine, the desired first torque being equal to a calibrated threshold of a target torque so to obtain a substantially zero torque difference between the dog clutch couplers; and
applying a desired second torque to the electrical machine, the desired second torque following a slope starting from said calibrated threshold value of the target torque and ending with a zero value.

2. The method of disconnecting according to claim 1, further comprising the step of deactivating a dog clutch actuator for disengagement of the dog clutch as soon as possible.

3. The method of disconnecting according to claim 2, further comprising the step of commanding the actuator to separate the dog clutch couplers.

4. The method according to claim 3, wherein said calibrated threshold of the target is adaptable with parameters.

5. The method according to claim 2 wherein said calibrated threshold of the target torque is adaptable with parameters.

6. A system for coupling an electrical machine with wheels of an axle of a vehicle when the vehicle is running, the drive axle being without a transmission clutch, comprising:
an upstream dog clutch coupler rotating together with the electrical machine, a downstream dog clutch coupler rotating together with the wheels, and an actuator arranged for bringing the two dog clutch couplers together in translation along a common rotation axis; and
an electronic device arranged for receiving a decoupling request and for torque control of the electrical machine by applying to the electrical device a torque equal to a calibrated threshold value of a target torque which facilitates achieving obtaining a zero torque as between the dog clutch couplers then following a slope starting with said calibrated threshold value of the target torque and ending with a zero torque value.

7. The system according to claim 6, further comprising a dog clutch actuator with which the dog clutch couplers are separated.

8. The system according to claim 7, wherein said calibrated threshold value of target torque is adaptable with parameters.

9. The system according to claim 6, wherein said calibrated threshold value of target torque is adaptable with parameters.

* * * * *

UNITED STATES PATENT AND TRADEMARK OFFICE
CERTIFICATE OF CORRECTION

PATENT NO.       : 9,037,326 B2                                  Page 1 of 1
APPLICATION NO.  : 13/515872
DATED            : May 19, 2015
INVENTOR(S)      : Eric Schaeffer and Florian Galinaud It is certified that error appears in the above-identified patent and that said Letters Patent is hereby corrected as shown below:

Title Page, item (22)
Replace "Jul. 12, 2010" with --Dec. 7, 2010--

Signed and Sealed this
First Day of March, 2016

Michelle K. Lee
*Director of the United States Patent and Trademark Office*